United States Patent [19]

Sakamoto et al.

[11] 4,213,679
[45] Jul. 22, 1980

[54] PROJECTOR

[75] Inventors: Kiyoshi Sakamoto, Hyogo; Yukio Tsukakoshi; Naoyuki Oie, both of Kasai, all of Japan

[73] Assignee: Sanyo Electric Co., Ltd., Moriguchi, Japan

[21] Appl. No.: 882,748

[22] Filed: Mar. 2, 1978

[30] Foreign Application Priority Data

Mar. 18, 1977 [JP] Japan .............................. 52-34620[U]

[51] Int. Cl.² .......................................... G03B 21/30
[52] U.S. Cl. ........................................ 353/72; 353/79; 353/75; 353/77; 353/119; 353/15
[58] Field of Search .................................. 353/77–79, 353/72, 17, 18, 119, 26 R, 26 A, 15; 352/104, 242, 243, 36, 34

[56] References Cited

U.S. PATENT DOCUMENTS

| | | | |
|---|---|---|---|
| 2,482,031 | 9/1949 | Rose | 353/75 X |
| 3,028,790 | 4/1962 | Wade et al. | 353/17 |
| 3,375,054 | 3/1968 | Hughes | 352/242 X |
| 3,479,116 | 11/1969 | Anderson | 353/77 |
| 3,704,054 | 11/1972 | Robak | 352/104 X |
| 3,715,155 | 2/1973 | Grupp | 353/119 X |
| 3,746,437 | 7/1973 | Pammer et al. | 352/104 |

FOREIGN PATENT DOCUMENTS

| | | | |
|---|---|---|---|
| 671930 | 9/1929 | France | 353/75 |
| 38-1292 | 3/1963 | Japan | 352/104 |
| 619843 | 3/1949 | United Kingdom | 353/79 |

Primary Examiner—Harry N. Haroian
Attorney, Agent, or Firm—Darby & Darby

[57] ABSTRACT

A motion picture projector in which projector mechanisms are incorporated in the body of a carrying case, the opening of which is covered by a panel structure on which a reel setting portion and an operation board are disposed. The panel structure is provided with a projection window through which a light beam from the projector mechanisms is projected. A cover attached to the case body by hinge means is provided in the inside thereof with a rear-projection screen assembly, which is adapted to engage the case body and to be supported in a predetermined angle together with the case cover when unfolded. A light beam from the projection window is reflected by a mirror disposed in the inside of the case cover so as to be projected on the screen assembly. A projector in accordance with the present invention is formed in a readily portable shape and has high versatility because films wound upon usual open-type reels are available. In addition, the projected image is easy to see because of the large screen size. A generally available attache case can be used instead of a specially designed case, and the use of such ready-made case results in a reduced manufacturing cost. High operation efficiency is also expected.

3 Claims, 10 Drawing Figures

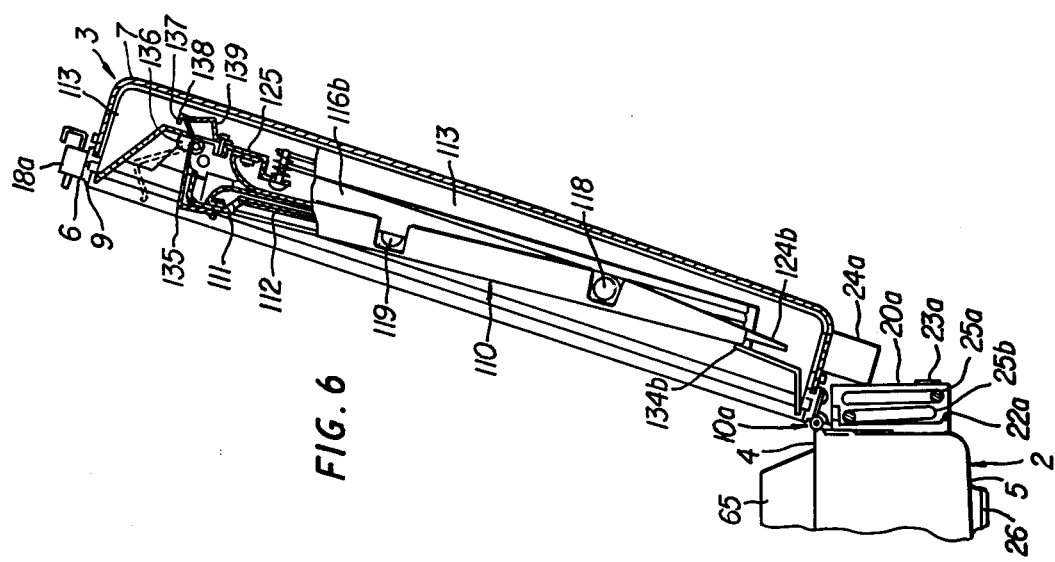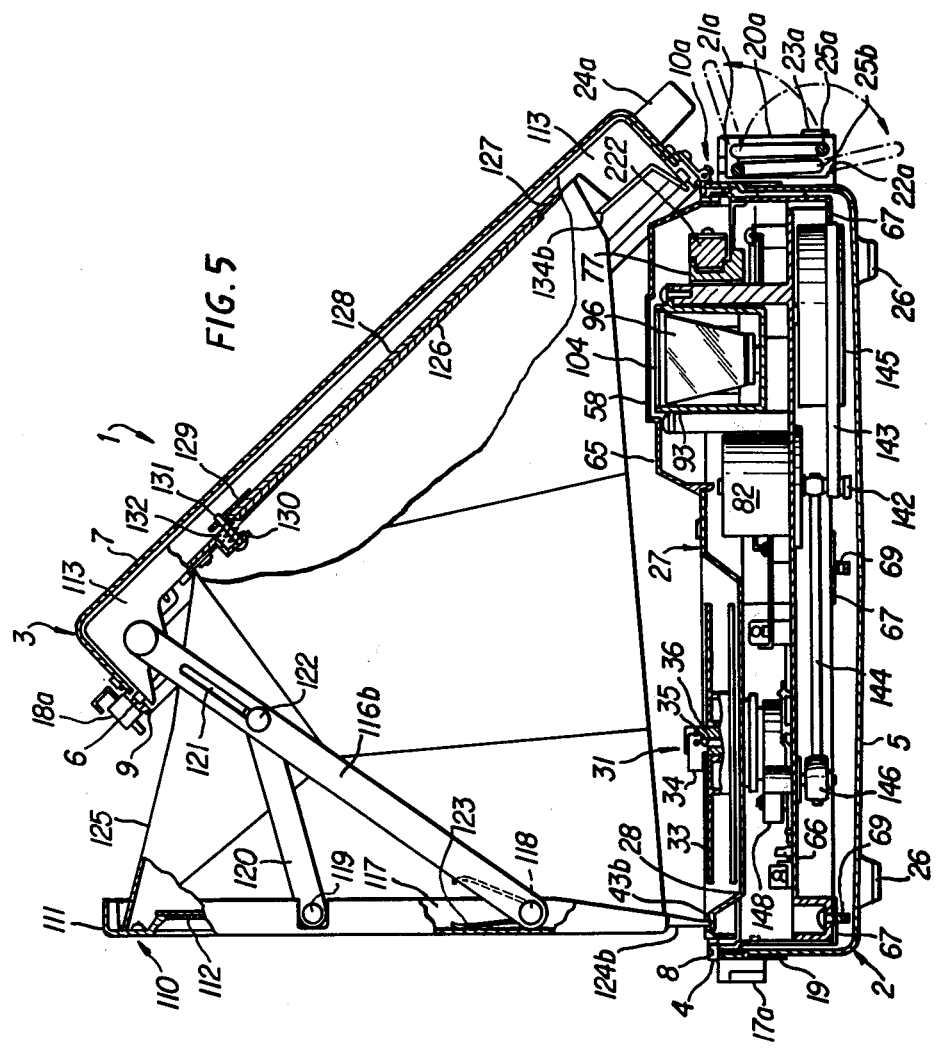

PROJECTOR

BACKGROUND OF THE INVENTION

Motion picture projectors for the type having all of the projector mechanisms and a screen within a single case, have so far been proposed in the U.S. Pat. Nos. 3,143,920, 3,375,055, 3,582,195 and 3,746,437. In these projectors, however, some have so small a screen that the image is difficult to recognize, and others require a specially designed film cartridge and consequently have only limited usability. Furthermore, some require much time and special skill for erecting the screen, and others are not easy to carry. Anyhow, all of prior art projectors use cases specially designed to accomplish their functions. It is a matter of course that designing a case with particular specifications will increase the manufacturing cost of the projector.

It is an object of the present invention to provide a projector which is handy to carry.

It is another object of the invention to provide a highly versatile projector for which films wound upon usual open-type reels which can be used as software.

It is further object of the invention to provide a projector whose operations can be readily carried out.

It is still another object of the invention to provide an economical projector by using a commercially available case instead of a specially designed one, and to eliminate the costs for setting up case manufacturing facilities and for designing the case structure.

BRIEF DESCRIPTION OF THE DRAWINGS

Description will now be made of one embodiment of a projector in accordance with the present invention, when taken in conjunction with the accompanying drawings, wherein:

FIG. 5 is a sectional view of the projected shown in FIG. 1;

FIG. 6 is a fragmentary sectional view of the case cover of the projector with the screen folded;

DETAILED DESCRIPTION OF THE INVENTION

Figure 1:
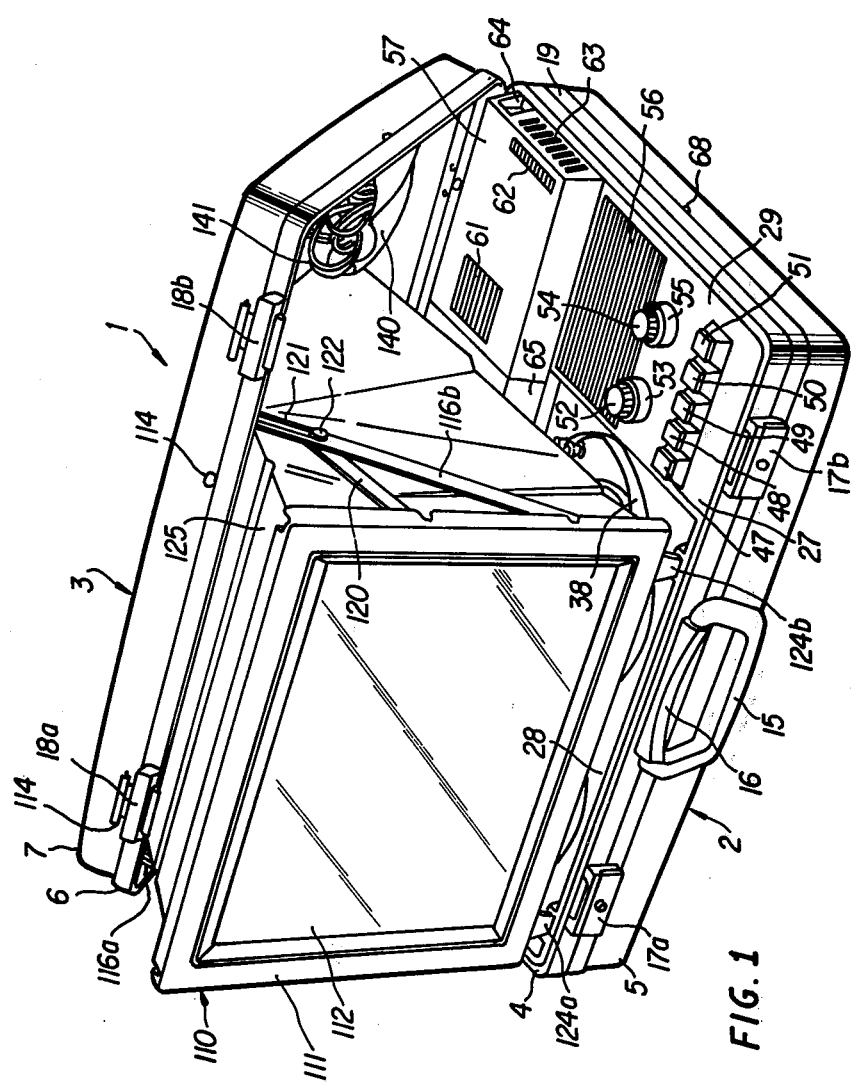
FIG. 1 is a perspective view of a projeector with the self-contained screen assembly in the erected position.

The appearance of a projector in accordance with the present invention is shown in FIG. 1 to FIG. 6.

A case 1, forming a housing for the projector, is a usual briefcase for papers, a so called "attache case". A relatively large size briefcase may be suitable to the projector in accordance with the present invention, because a space of a certain extent is required therein for arranging reels and an operation board.

The case 1 comprises a body 2 and a cover 3. Since the art of manufacturing a case is rather conventional a, brief description will now be made about how to make the case 1 by referring to the drawings, particularly to FIG. 5. It should be noted that the projector or a portion thereof shown in FIGS. 5 and 6 are not sectioned along with a specific line, but are sectioned or broken away at relatively random portions in order to show the construction clearly.

The body 2 comprises a metal frame 4 and a shell 5. The metal frame 4 is made of aluminium, or an aluminium or magnesium alloy. Such materials are bent into a rectangular frame shape, after having been extruded in a predetermined section. The shell 5 is a pressed web of aluminium or magnesium alloy coated with synthetic resin, or a web of synthetic resin, polypropylene or ABS (acrylonitrile-butadiene-styrene). The metal frame 4 and the shell 5 are joined to each other with adhesives or rivets.

The cover 3 also compriseses a metal frame 6 and a shell 7. When selecting the materials of the frame 4 and the shell 5 from the viewpoint of strength, it would be recommended to take professional advice of manufacturers in the field. To improve the sealing condition between the cover 3 and the body 2, the metal frame 4, which forms the body opening edge, is provided with a groove 8 thereon, and the metal frame 6, which forms the cover opening edge, has a ridge 9 adopted to fit said groove 8.

The body 2 and the cover 3 are attached to each other at one of longitudinal sides thereof by a pair of hinges 10a and 10b. In this embodiment the cover 3 can be separated from the body 2 at said hinges for a purpose as described later.

Figure 7:
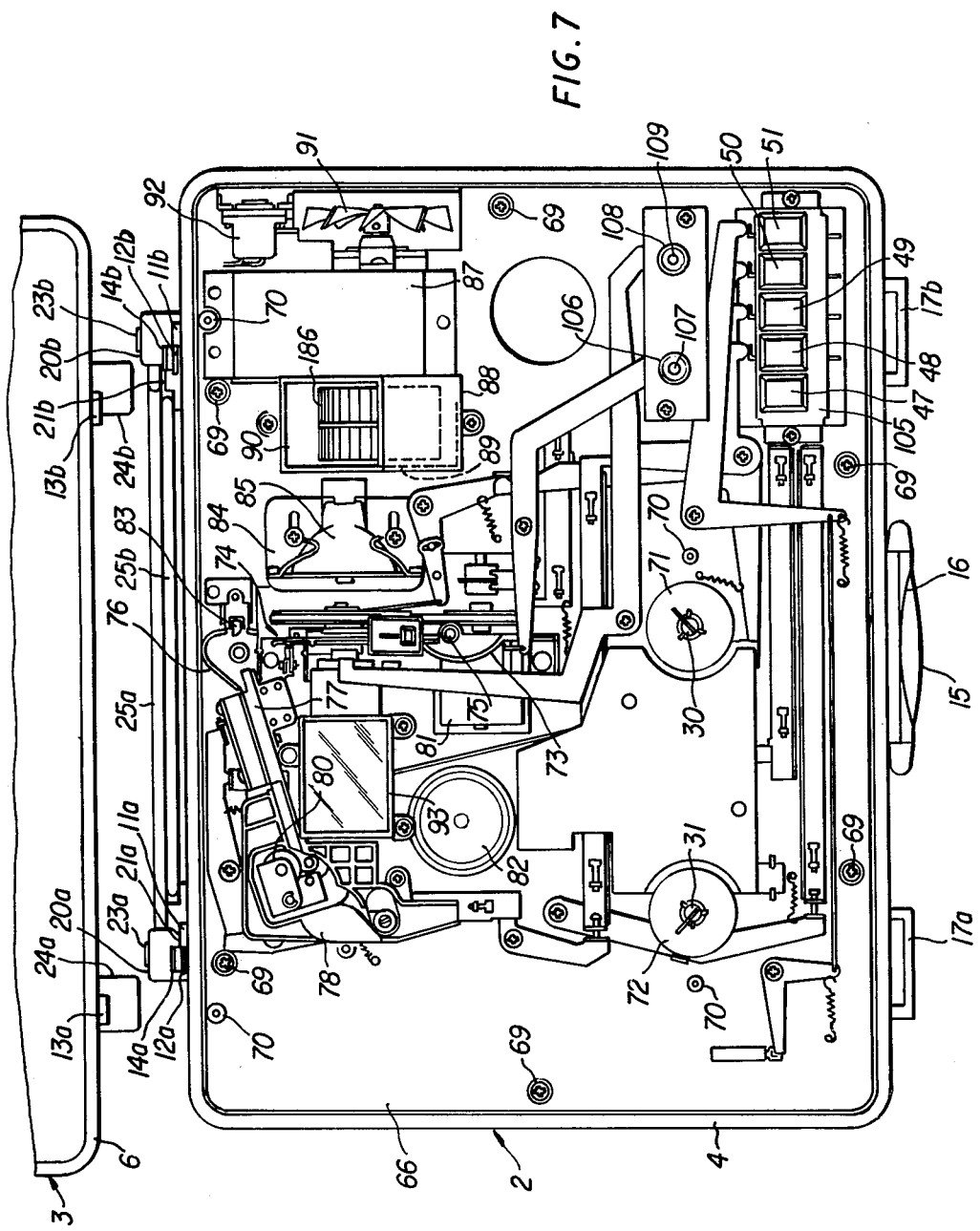
FIG. 7 is a plan view of the case body with the panel structure removed.

As shown in FIG. 7, metal hinge plates 11a and 11b fixed to said frame 4 with a plurality of rivets respectively have shafts 12a and 12b, each projecting in parallel with the longitudinal sides of the body 2. Metal hinge plates 13a and 13b fixed to frame 6 with a plurality of rivets have hollow portions to receive the shafts 12a and 12b, respectively. Consequently, when the cover 3 is moved to the left in FIG. 1 the hinge plates 13a and 13b are respectively detached from the shafts 12a and 12b and the cover 3 separates from the body 2. By reversing the procedure, the cover 3 and the body 2 are again joined to each other.

The hinge plates 11a and 11b are provided with covers 14a and 14b, respectively, for protecting the shafts 12a and 12b from being hit by other things after the cover 3 has been removed. It is a matter of course that the covers 14a and 14b are made so as not to prevent rotation of the hinge plates 13a and 13b around the shafts 12a and 12b within a predetermined angle range.

At another longitudinal side of the body 2 on which hinges are not attached, the metal frame 4 is provided with a handle mount 16 of metal for rotatably supporting a handle 15 made of synthetic resin. The handle mount 16 is fixed to the metal frame 4 with a plurality of screws threaded thereto from the inside of said frame.

A pair of latch members 17a and 17b are fixed to the metal frame 4 at the left and right hands of the handle mount 16 by a plurality of screws also threaded thereto from the inside of said frame. Another pair of latch members 18a and 18b adapted to engage with said members 17a and 17b are fixed to the metal frame 6 of the cover 3 in the similar manner. Any type of latch generally used with an attache case can be used, but those equipped a locking mechanism may be preferred.

The body 2 is provided at the periphery thereof with a mtal band 19 for decoration purpose.

Figure 2:
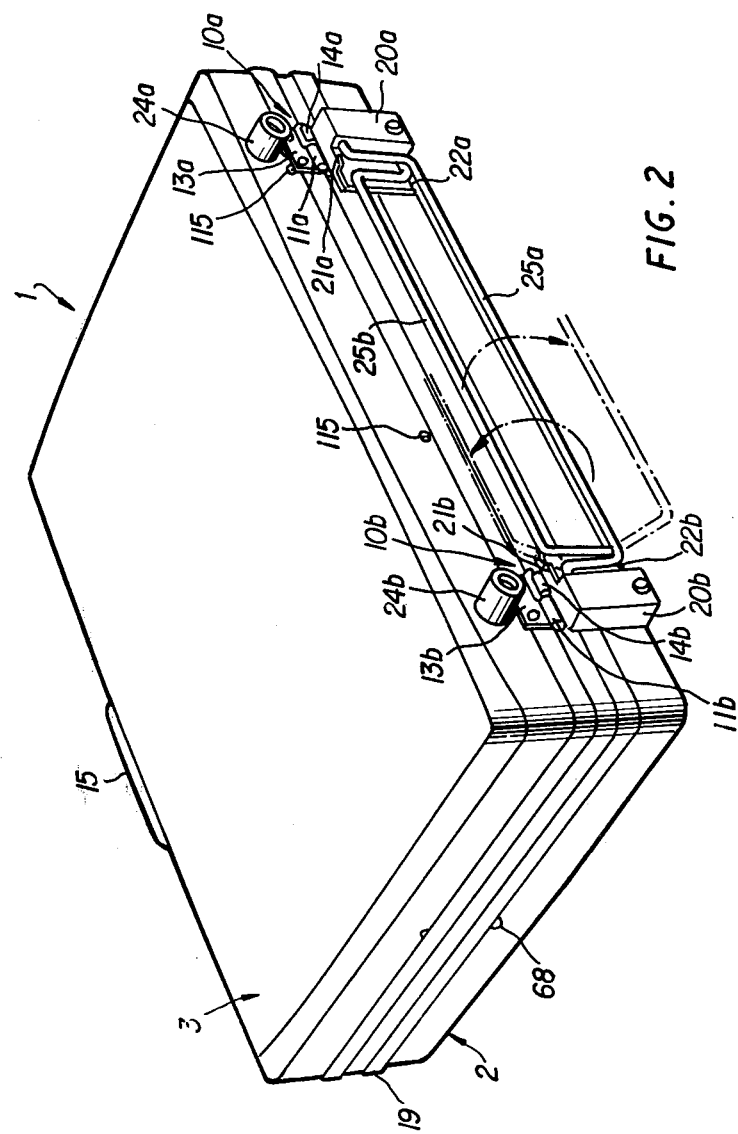
FIG. 2 is a perspective rear view of the projector shown in FIG. 1 with the case cover closed.

Four fixed supports of synthetic resin are fixed at the longitudinal sides of the body 2 and the cover 3, the sides to which the hinges 10a and 10b are secured. These fixed supports are so formed that the case 1 can stand with the handle 15 up. Each of the fixed supports 20a and 20b fixed to the body 2 comprises a main body in the shape of substantially rectangular parallelepiped and a projecting portion extending toward its counterpart. As shown in FIG. 2, the projecting portions are provided at the upper and lower edges thereof with shoulder portions 21a and 22a, and 21b and 22b, respectively. The fixed supports 20a and 20b are symmetrically shaped and disposed to each other.

The fixed supports 20a and 20b are provided with floor contacting protuberances 23a and 23b, respectively. The fixed supports 24a and 24b disposed on the cover 3 are made in a simple cylindrical shape. These fixed supports are fixed either to the body 2 or the cover 3 by one or more screws threaded thereto from the insides of said body 2 or the cover 3. The fixed supports 24a and 24b are located in alignment with the fixed supports 20a and 20b. Thus, when the body 2 is placed on its wide side and the cover 3 is opened, as seen in FIG. 6, the fixed supports 24a and 24b of the cover 3 engage with the fixed supports 20a and 20b of the body 2 after the angle between said cover and body exceeds 90°, then the cover 3 remains at that position by itself. This means that both hands of the user can be used for mounting film reels or pulling out the screen assembly, thereby such operations can be done easily.

Figure 4:
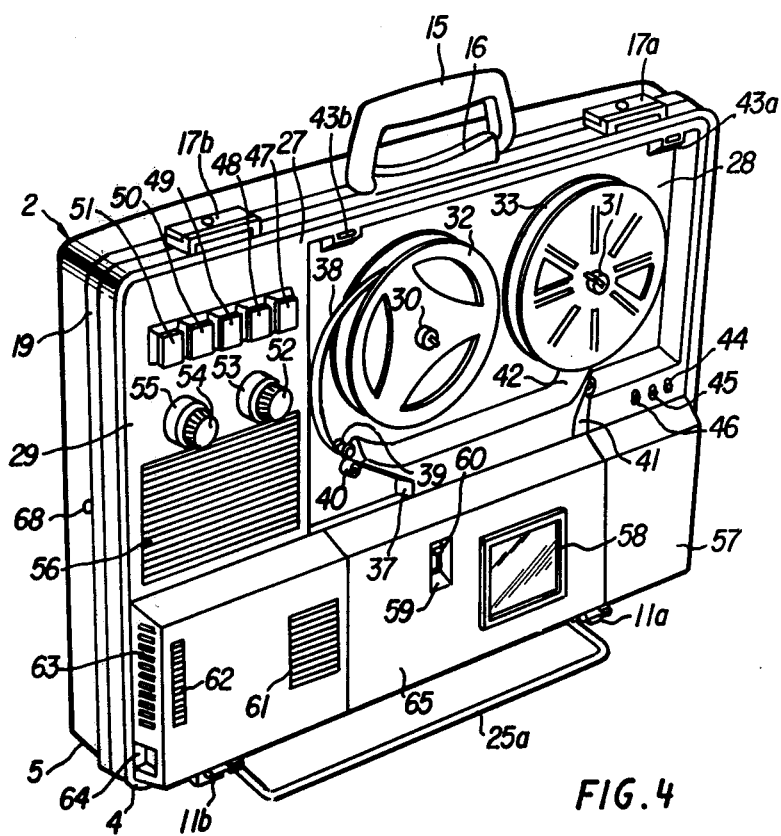
FIG. 4 is a perspective view of the case body of the projector being used for projecting a picture on a remote screen.

Movable supports 25a and 25b made of thick steel wires are disposed between the fixed supports 20a and 20b. The movable supports 25a and 25b are formed in a crank shape. Both ends of each movable support 25a or 25b are rotatably inserted into blind holes defined in the opposite sides of the fixed supports 20a and 20b. Both ends of the movable support 25a are inserted into the blind holes defined near the shoulder portions 21a and 21b, and both ends of the movable support 25b are inserted into the blind holes defined near the shoulder portions 22a and 22b. Both ends of the movable supports 25b are disposed closer to the body 2 than those of the movable supports 25a. When the movable support 25b is thrown toward the shoulder portions 21a and 21b and the movable support 25a is thrown to the shoulder portions 22a and 22b, the movable supports 25a and 25b overlap on each other as shown in solid lines in FIGS. 2, 5 and 6. The movable supports 25a and 25b are thus housed within the space between the fixed supports 20a and 20b. As shown in FIG. 4, the movable supports 25a and 25b may be used for supporting the body 2 uprightly with the cover 3 removed. As shown by broken lines in FIGS. 2 and 5, as the movable supports 25a and 25b are outwardly spread, the legs of the movable support 25a strike against the shoulder portions 21a and 21b and the legs of the movable support 25b strike against the shoulder portions 22a and 22b, and subsequently both movable supports 25a and 25b stop there. In this condition, free ends, i.e. the main portions of the movable supports 25a and 25b are on the same level with the protuberances 23a and 23b and protrude out of the case body side.

In such condition, the body 2 can stand vertically on widely spread movable supports 25a and 25b with stability. The body 2 in this posture can project a picture on a remote screen as described later. It should be noted that, subjected to resistance against rotation due to friction between the movable supports 25a and 25b and the fixed supports 20a and 20b, the movable supports 25a and 25b will not sway to and fro freely.

In order to prevent damages to the body 2 or unsteady placement of the body 2 when the case 1 placed with the body 2 down, auxiliary supports 26 as shown in FIG. 5 are disposed at each corner of the most extensive side of the body 2. These auxiliary supports 26 may be made of synthetic resin or rubber, and fixed to the body 2 by screws or adhesives.

A synthetic resin panel structure 27 covers the opening plane of the body 2. The shape of the panel structure 27 and components arranged thereon are described below.

A approximately two thirds of the front part of the panel structure 27 is occupied by a reel setting portion 28 at the left hand and an operation board 29 at the right hande. The reel setting portion 28 is about twice the area of the operation board 29.

The operation board 29 is nearly at the same height as the opening edge of the body 2, while the reel setting portion 28 is recessed by a depth corresponding to the thickness of the reels.

When facing the handle mounted side, a supply spindle 30 is disposed at the right hand and a take-up spindle 31 is disposed at the left hand, in the reel setting portion 28. A supply reel 32 and a take-up reel 33 are set on the supply spindle 30 and the take-up spindle 31, respectively.

The spindles 30 and 31 are provided with suitable means for preventing the reels from coming out. Any means generally used in projections or magnetic tape recorders may be utilized. In accordance with this embodiment, a retainer 34 in the form of a thin metallic plate is pivoted in a slit formed at the tip of the spindle 31, as shown in FIG. 5. The retainer 34 can be turned in approximately 180° range, and is provided around the pivoted portion thereof with three recessed portions 35 spaced apart a 90° interval. The spindle 31 is hollow, and a ball 36 inserted therein is pressed against the retainer 34 by a compression spring. The engagement of the ball 36 to one of said recessed portions 35 holds the retainer 34 in the corresponding position. As shown in FIG. 5 when the retainer 34 is turned sideways with respect to the axis of spindle 31, the reel 33 is prevented from coming out. When the retainer 34 is raised uprightly, the reel 33 can be pulled out. The same structure retainer is used for the spindle 30.

Formed at the distant edge of the reel setting portion 28 is a film entrance 37 into which a film 38 from the supply reel 32 enters through guide rollers 39 and 40 disposed in front thereof. The film 38 is then guided to a film gate which is hidden by the panel structure 27. The film 38 then goes through a magnetic sound track reproducing equipment and comes back to the reel setting portion 28 through the film exit 41 disposed on the left hand with respect to the film entrance 37.

The film exit 41 is provided with a guide nose 42 for guiding the film toward the center of the take-up reel 33. An automatic winding type reel, constructed to catch the film tip by frictional action or claw members, is desirable to use as the take-up reel.

The reel setting portion 28 is provided at the front edge thereof with two recesses 43a and 43b in spaced relationship for supporting a screen assembly as described later. Three jacks 44, 45 and 46 are disposed on a stand located at the rear-left part of the reel setting portion 28. The left hand jack 44 is assigned for an earphone, the intermediate jack 45 for a microphone and the right hand jack 46 for auxiliary input.

The operation board 29 is provided with a push-button 47 for release, a push-button 48 for projection, a push-button 49 for still picture projection, a push-button 50 for rewinding the film, and a push-button 51 for recording on the film. These push-buttons are transversely disposed in a line.

Figure 3:
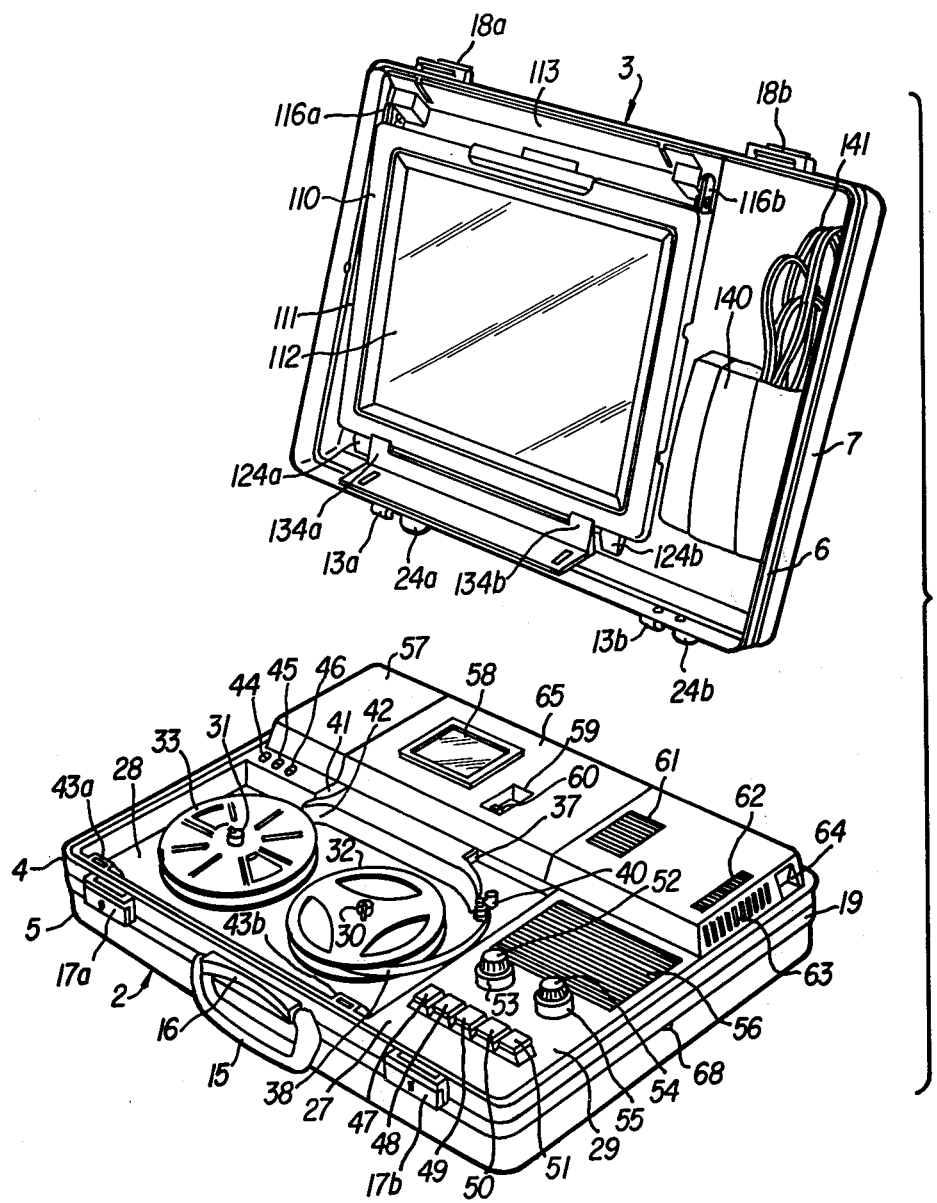
FIG. 3 is a perspective view of the projector shown in FIG. 1 with the case cover separated from the case body.

The operation board 29 is also provided at the left hand thereof with a dial 52 for advancing the film in the still picture projection mode and a dial 53 for adjusting the image in vertical direction, and at the right hande thereof with a dial 54 for controlling the volume of the re-produced sound and a dial 55 for adjusting the focus of the image. As best shown in FIG. 3, the dial 52 and 53 are coaxially disposed, and the dials 54 and 55 are mounted in the same manner. Under the speaker grille 56, a speaker (not shown) is attached to the panel structure 27.

The approximately one-third remainder part of the panel structure 27 is occupied by a protruding trapezoidal section portion 57 projecting from the opening edge of the body 2. The protruding portion 57 is provided at the left hand thereof with a rectangular projection window 58, and at the right side of said window 58 a rectangular recessed portion 59 is formed. In said recessed portion 59 a knob 60 projects, said knob 60 is extended from the film gate and is adopted to convert the film driving mechanism to regular 8 film mode or to super 8 film mode.

A ventilating grille 61 is disposed at the right hand side of the recessed portion 59. Other ventilating grilles 62 and 63 are formed near the right corner of the protruding portion 57. An aperture 64 is disposed at the rear part of the right side of the protruding portion 57. The aperture 46 is provided at the inside thereof with a socket to which a power code is adapted to be connected.

Under the protruding portion 57, the film path main portions, such as the film gate and the sound track reproducing equipment are disposed. In these main portions troubles such as a film jamming occasionally take place. The center part of the protruding portion 57 including the projection window 58 and the recessed portion 59 is therefore constructed separately from the panel structure main body to form a removable panel 65 in order to set right such troubles or facilitate inspection or maintenance operation. As shown in FIG. 5, the front and rear edges of the removable panel 65 respectively engage the panel structure 27 main body and the metal frame 4 by the panels elasticity, so that the removable panel 65 may be removed merely by bending it by hand without using any tools.

FIG. 7 is a plan view of the body 2 with the panel structure 27 removed therefrom. To facilitate the understanding of structure, wiring is omitted in FIG. 7. It should be noted that a portion of thee cover 3 shown at the upper part of FIG. 7 is illustrated in a manner much simplified than the body 2, for it is represented only to show the hinge structure. The internal structure of the body 2 will better be understood with the aid of FIG. 5.

A chassis 66 is made of synthetic resin to a size slightly smaller than the inside dimensions of the body 2, and carries various members on the upper and lower surfaces thereof. The chassis 66 is fixed in the following manner.

A plurality of steel bracket 67 having an approximately L-shaped section are fixed to the inside of the metal frame 4. At the longitudinal sides of the metal frame 4, the brackets 67 may be fixed to the metal frame 4 by utilizing screws for attaching the latch members 17a and 17b and the fixed supports 20a and 20b. In this manner, four brackets 67 can be fixed. At each of the shorter sides perpendicular to the longitudinal sides, one bracket 67 is fixed by screw or rivet 68 from the outside of the body 2 as shown in FIGS. 1 to 4. The chassis 66 is fixed to the brackets 67 by screws 69.

The detail of the chassis 66 is as follows:

Four bosses 70 are integrally moulded to the chassis 66 for fixing the panel structure 27 by screws. In order not to harm the appearance of the panel structure 27 by screw heads, two bosses 70 in the front part are located at the position where the corresponding screw heads may be hidden by the supply reel 32 and the take-up reel 33, and two bosses 70 in the rear part are located at the positions behind the rear slope of the protruding portion 57. At the portion of the chassis 66 corresponding to the reel setting portion 28, a turndisc 71 for the supply reel 32 and a turndisc 72 for the take-up reel 33 are rotatably disposed. In the arrangement of this embodiment, a film 38 from the supply reel 32 enters the inside of the panel structure 27 through the film entrance 37, and is guided to a film gate 74 through the first guide 73 of synthetic resin having a guide roller 75, and is further guided from the film gate 74 to the magnetic head 77 through the second guide 76 of synthetic resin disposed at the rear of the film gate 74. In the second guide 76 the film 38 forms a loop. And the film 38 is further guided from the magnetic head 77 to the film exit 41 through the third guide 78 of synthetic resin, and is wound upon the take-up reel 33. In the third guide 78, a capstan 79 and a pinch roller 80 are disposed. A DC motor 81 is disposed as a source of power for intermittently moving the film 38 by a cam and claw means of well known at in the film gate 74, and a DC motor 82 is disposed for driving the capstan 79 and the turndiscs 71 and 72.

It is required to synchronize the revolution speeds of the motors 81 and 82 in order to feed a film smoothly. To this subject, the U.S. Pat. No. 2,982,172 has proposed a technique in which the film feeding speed at the sound track reproducing equipment is kept constant while the film feeding speed at the film gate is varied according to the film loop size between said sound track reproducing equipment and film gate by means of an arm which detects the film loop size and gives on-off signals to the control circuit for the intermittently-driving motor.

A similar technique is used in this embodiment. Namely, a movable sensor 83 projects into the second guide 76 for detecting the size of film loop.

A projection lamp 85 disposed at the right hand of the film gate 74 is supported by a lampholder 84 of steel plate. Because a projection lamp produces, as well known, a great amount of heat, a cooling fan 86 is placed at the right hand of the projection lamp 85. The cooling fan 86 is a centrifugal type one made of synthetic resin, and is rotated by a shaded pole motor 87. Said fan 86 is housed in a synthetic resin casing 88 having an inlet 89 toward the projection lamp 85. A flow of cooling air is therefore produced from the film gate 74 to the projection lamp 85. An outlet 90 of the fan casing 88 is connected to the ventilating grille 61.

For cooling the motor 87 itself, the motor 87 is provided at another end of the shaft thereof with an axial-flow cooling fan 91 made of sheet metal. The cooling fan 91 draws air from the ventilating grilles 62 and 63, and feeds it to the gap between the stator and the rotor of the motor 87. The gap between the stator and the rotor communicates with the inside of the fan casing 88. The air which has cooled the motor 87 enters the fan casing 88 under the influence of suction by the cooling fan 86, and is then discharged from the ventilating grille 61. The motor 87 may also serve as a transformer for dropping a commercial power voltage to a voltage suitable to the motors 81 and 82. Disposed at the right hand of the motor 87 is a socket 92 adopted to connect a power card therewith.

Figure 9:
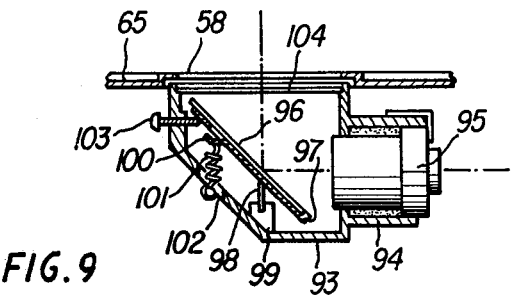
FIG. 9 is a sectional view of the lens and mirror holder.

A lens and mirror holder 93 of synthetic resin is disposed at the left hand of the film gate 74, and the inside structure thereof is shown in FIG. 9. The holder 93 has a cylindrical portion 94 projecting toward the film gate 74. A projection lens assembly 95 comprising a series of lenses is held in the cylindrical portion 94. The projection lens assembly 95 is movable in the axial direction for adjusting the focus of the image. The first mirror 96 disposed in the holder 93 reflects the light beam passed through the projection lens assembly 95 to the projection window 58, and is so constructed that its inclination can be adjusted. Namely, the first mirror 96 is fixed to a sheet metal carrier 97 which has a pair of legs 98 formed integrally therewith. The legs 98 are in engagement with a pair of receiving members 99 provided within the holder 93. In such construction, the first mirror 96 can be inclined by using the engagement portions as a fulcrum. A hook 100 is formed integrally with the carrier 97 at the left hand of the legs 99. A tension spring 101 is hung by one end thereof on the hook 100, and the other end of said spring 101 engages with the edge of a hole 102 defined on the bottom of the holder 93. Thus rotational force in a counterclockwise direction is imparted to the carrier 97. A screw 103 is threaded to the left wall of the holder 93 from outside and its tip holds the carrier 97 against said rotational force. By turning the screw 103 the inclination of the carrier can be changed, and consequently the first mirror 96 is adjusted so as to reflect the light beam in the desired direction. A dustproof glass 104 is fitted in the opening of the holder 93 corresponding to the projection window 58.

Referring now again to FIG. 7, a switch 105 having five push-buttons 47, 48, 49, 50 and 51 as mentioned earlier is disposed at the front-right portion of the chassis 66 in FIG. 7. This is a switch of the type generally used in a tape recorder, i.e. the type in which selective pressing of push-button will cause the formation of a corresponding electrical circuit and the motion of the mechanical linkage belonging to the push-button being pressed. Thus selective operation is carried out. As mentioned before, these push-buttons have assigned tasks respectively. Namely, the push-button 48 is assigned for the projection mode, the push-button 49 for the still picture projection mode, the push-button 50 for the film rewinding mode and the push-button 51 for the recording mode. The left end push-button 47 is assigned for releasing operation. Pressing the push-button 47 makes all of other pressed push-buttons be reset and all functions being operated will therefore be stopped.

Shafts 106, 107, 108 and 109 corresponding to the dials 52, 53, 54 and 55 mentioned earlier are disposed in the rear side of the switch 105. The shafts 106 and 108 project through the hollow insides of the shafts 107 and 109, respectively. The individual dials are fixed to the corresponding shafts by a conventional means generally used for dials of radio or television sets, for example, a screw threaded through the dial.

The shaft 106 is used for feeding a film 38 one frame at a time during the still picture projection mode, and the shaft 107 for adjusting the vertical position of the frame of the image projected on the screen. The shaft 109 is used for adjusting the focus of the image, and the shaft 108 connected to a variable resistance (not shown) is used for adjusting the volume of sound from a sound film.

A circular hole, illustrated in FIG. 7 at the rear side of the shafts is formed in the chassis 66 for receiving the coil of the speaker (not shown) attached on the reverse side of the speaker grille 56 mentioned earlier.

Description will now be made of the structure of the cover 3. As apparent from FIGS. 1 to 3, the cover is provided at its inside position corresponding to the reel setting portion 28 of the body 2, with a screen assembly 110, which is constituted by a rear-projection screen 112 securely fitted in a synthetic resin frame 111. In order to support the screen assembly 110, a synthetic resin base 113, as shown in FIGS. 3, 5 an 6 is fixed to the inside of the cover 3 by the screws 114 as shown in FIG. 1 and the screws 115 shown in FIG. 2. A pair of swing arms made of steel plate 116a and 116b are attached to the both sides of the base 113 adjacent the free end of the cover 3. As shown in FIG. 5, the frame 111 of the screen assembly 110 is provided at the inside of the side edge flanges thereof with ribs 117 arranged in parallel with said side edge flanges. The free end of the swing arm 116b is connected to the rib 117 by a pin 118.

One end of an auxiliary arm 120 made of steel plate is connected to the rib 117 by a pin 119 at the upper position with respect to the pin 118, and the other end of the auxiliary arm 120 is slidably connected to a longitudinal slot 121 defined in the swing arm 116b, by a pin 122. A torsion spring 123 attached to the pin 118 gives to the screen assembly 110 and the swing arm 116b a force to widen the angle between them, so that the screen assembly 110, the swing arm 116b and the auxiliary arm 120 will form a triangle shape. The same structure is adopted for other swing arm 116a.

When, with the cover 3 opened, the screen assembly 110 is pulled out and projections 124a and 124b projecting from the lower portion of frame 111 are engaged with the recesses 43a and 43b of the panel structure 27, the case 1 will form a quadrilateral with the body 2, the cover 3, the screen assembly 110 and the swing arms 116a and 116b combined with the auxiliary arms 120, as four sides. In this condition, the screen assembly 110 projects out of the case cover 3 and stands approximately vertically. It would be noted that such state as shown in FIGS. 1 and 5 is stabilized by the torsion springs 123.

A light shield 125, made of sheet material of cloth, synthetic resin or laminated layer of both cloth and synthetic resin, is disposed between and attached along the opposite edges thereof to the base 113 and the three sides of the screen assembly 110 except the lower side thereof. In FIG. 1 and FIG. 5, the light shield 125 covers the reel setting portion 28 and the projection window 58.

In the inside of the light shield 125 is disposed a second mirror 126, which reflects the light beam form the projection window 58 toward the screen 112.

For projecting an image in focus on all parts of the screen 112, it is necessary not only to set the screen 112 to the proper angle, but also to mount the second mirror 126 in the proper angle. In consideration of this, it is desirable that the angle of the second mirror 126 be adjustable. For this purpose, a mirror carrier 128 is constructed integrally with the base 113 through a thin hinge portion 127. In order to form the thin hinge portion 127, the base 113 may preferably be made of polypropylene. The second mirror 126 is secured to the surface of the carrier 128, and a steel plate 129 serving as a nut is secured to the free end of the carrier 128. A hook 130 protrudes from the base 133 so as to face the steel plate 129, and a screw 131 inserted in the hook 130 is threaded to the steel plate 129. A compression coil spring 132 is disposed outside of the screw 131 and between the steel plate 129 and the hook 130. Tightening and loosening the screw 131 changes the angle of the carrier 128, thereby the angle of the second mirror 126 changes.

Figure 8:
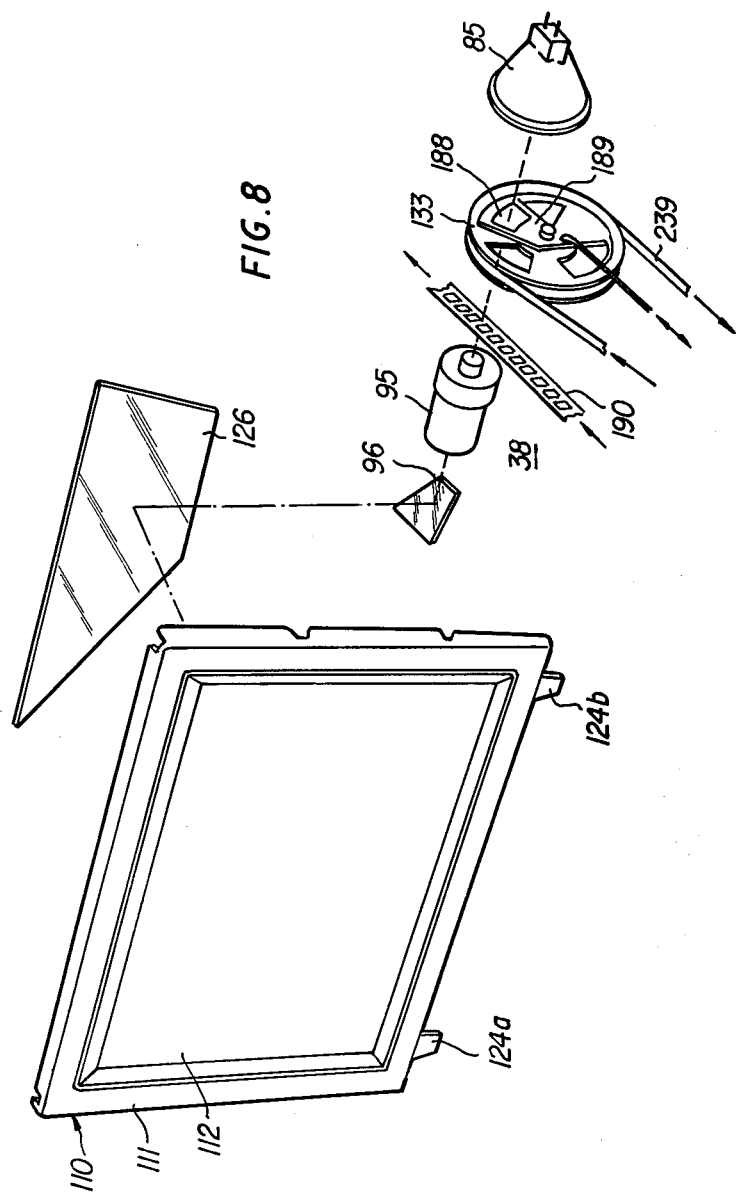
FIG. 8 is an explanatory view showing the arrangement of the optical system.

Referring now to FIG. 8 illustrating the arrangement of the optical system, the projection lamp 85, a shutter 133, the film 38, the projection lens assembly 95 and the first mirror 96 are aligned with each other on the optical axis. In such an arrangement, the light beam reflected by the first mirror 96 is again reflected by the second mirror 126 and projected on the screen 112.

When the cover 3 is to be closed, the screen assembly 110 is folded against the cover 3 as shown in FIGS. 3 and 6. Namely, the swing arms 116a and 116b are first swung toward the inside of the cover 3, and the lower end of the screen assembly 110 is engaged with projections 134a and 134b integrally constructed with the base 113. The upper side of the screen assembly 110 is then pressed toward the cover 3 agains the torsion springs 123. The auxiliary arms 120 become parallel with the swing arms 116a and 116b as the pins 122 slide upward within the slots 121. Thorough these operations, the light shield 125 is folded between the screen assembly 110 and the base 113.

A clamp 135 is rotatably attached to the base 113. The clamp 135 is made of a metal sheet bent into the hook shape and pressingly holds the upper side of the screen assembly 110. The other end of the clamp 135 enters the reverse side of the base 113 through a hole 136 defined in the base 113, and engages a leaf spring 137 fixed to the base 113. The leaf spring 137 is formed in an M-shape having two bottoms 138 and 139. As shown in the solid and broken lines in FIG. 6, the clamp 135 has a first stable position wherein the end of it engages with the bottom 138 of the leaf spring 137, and a second stable position wherein said end engages with the bottom 139 of said spring 137. When the clamp 135 is at the first stable position, the screen assembly 110 can be held in the folded position, and when the clamp 135 is turned to the second position the screen assembly 110 can be unfolded.

As shown in FIGS. 1 and 3, in the inside of the cover 3 an accessory containing pocket 140 is disposed at the right hand of the screen assembly 110 and the light shield 125. The pocket 140, made of cloth or synthetic resin, may be used for containing a power card 141, a microphone (not shown) or sound auxiliary input card (not shown), etc. For user's convenience, it is desirable to divide the pocket 140 into several spaces as shown in FIG. 3.

With the cover 3 removed as shown in FIG. 4, the body 2 can stand with the aid of the movable supports 25a and 25b for projecting the light beam from the projection window 58 on a remote reflection-type screen. When the body 2 is thus made to stand with the handle 15 up, the same image as one which would appear on the screen 112 is projected on the remote screen due to the absence of the second mirror 126 and the posture of the body 2 itself.

Disposed under the protruded portion 57 ae the relatively heavy cooling fan motor 87 and the important optical system components such as projection lamp 85, film gate 74 and projection lens assembly 95. This arrangement increases the stability of the body 2 when it is made stand with the handle 15 up, and is effective to decrease the shock to the optical system in case the body 2 should fall down.

Figure 10:
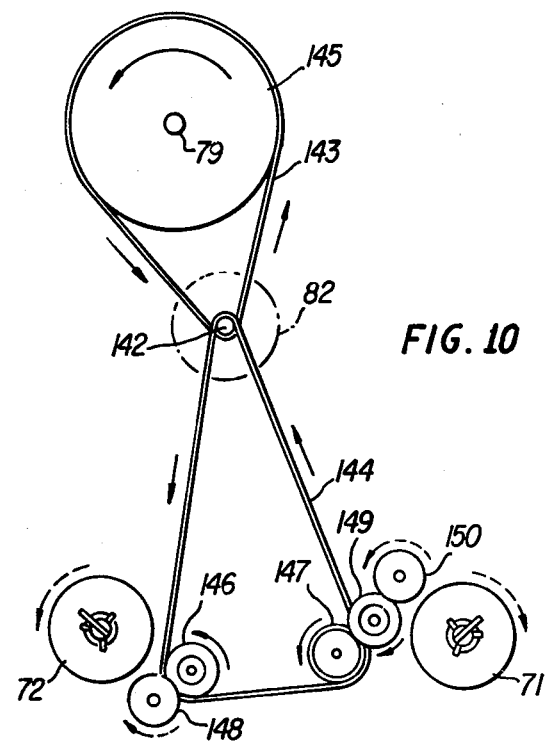
FIG. 10 shows the drive mechanisms for the capstan and turndiscs for reels.

With reference to FIG. 10a, description will now be made of the drive system which is powered by the motor 82. This will better be understood also by referring to FIG. 5.

Two belts 143 and 144 are applied to the drive shaft 142 of the motor 82. The belt 143 drives a flywheel 145 directly connected to a capstan 79. The belt 144 drives pulleys 146 and 147.

An idler 148 is provided for connecting the pulley 146 with the turndisc 72. In the projection mode, the idler 148 comes in contact with both the pulley 146 and the turndisc 72 at the same time, and makes the turndisc 72 rotate in counterclockwise direction. The pulley 147 is frictionally connected with a pulley 149, which can be connected to the turn disc 71 by an idler 150. In the rewinding mode, the idler 150 comes in contact with both the pulley 149 and the turn disc 71 at the same time, and makes the turn disc 71 rotate in clockwise direction. Each of the turn discs 71 and 72 incorporates a slip clutch mechanism of the type generally used in tape recorders, so that excess tension will not be applied to the film 38.

As described hereinbefore, the projector in accordance with the present invention may be fitted in an usual attache case with the projector mechanisms disposed in the case body and with the screen assembly disposed in the case cover. Therefore, the costs for designing a special case and for manufacturing such cases can be eliminated because a commercially available attache case may, in principle, be utilized, and such a case can be readily obtained. On the panel structure covering the opening of the case body, a reel setting portion and an operation board are disposed at the left hand and at the right hand, respectively, along the longitudinal side of the case. A specially designed film cartridge is not needed, but instead the usual open-type reels can be used on said reel setting portion. Consequently, the availability of film is large. In addition, with the case horizontally placed on a supporting surface, reels can be readily loaded to the reel setting portion. This means that the reel setting operation is easy, and because the operation board is also horizontally placed, operation on the operation board can also be readily carried out. Further more, a screen assembly is mounted within the case cover and said screen assembly is adapted to support the case cover when said screen assembly engages the panel structure. A light shield between the screen assembly and the case cover covers the reel setting portion, so the reels are protected from accidental touch of hand during rotation.

When the screen assembly is pulled out from the case cover, the light shield is automatically unfolded, so the screen setting procedure requires no special skill or long operation time. It is now well understood that the present invention provides a novel and useful projector having various advantages.

What is claimed is:

1. A film projector comprising:
   a case body;
   a case cover;
   separable hinge means removably connecting said cover to one side of said case body;
   projector means located in said case body;
   a projection window through which the image projected by the projector means is transmitted disposed in said case body facing the inner surface of said case cover;
   collapsible rear projection screen assembly means mounted in the inside of said case cover and including means adapted to engage said case body to support the screen assembly means and the case cover at a predetermined angle relative to said case cover when the cover is unfolded;
   a mirror disposed at the inside of said case cover for reflecting and rear projecting the image from said projection window onto said screen assembly means; and
   retractable support means mounted on a side of said case body, said retractable support means adapted to change its span from a housed position where its supporting width does not exceed the thickness of said side of said case body to an extended position where its supporting width exceeds the thickness of said side of said case body, said support means when in said extended position being capable of supporting thereon said case body with said case cover removed therefrom so that the image can be front projected.

2. A film projector as in claim 1 wherein said retractable support means is mounted on the side of said body to which said hinge means is attached, and a handle attached to said case body on a side opposite to said movable support means.

3. A projector as set forth in either of claims 1 or 2 further comprising:
   a pair of spaced apart fixed supports fixed on the side of said case body to which said retractable support means is mounted; and
   said retractable support means comprising a pair of crank-shaped movable support means disposed between said fixed supports and, said pair of movable supports being unfolded outwardly by turning the free ends thereof to the outside of said case body, and being housed between said fixed supports by turning the free ends thereof inwardly.

* * * * *